US012416713B2

United States Patent
Land et al.

(10) Patent No.: US 12,416,713 B2
(45) Date of Patent: Sep. 16, 2025

(54) UWB-BASED SIDE OF DOOR DETECTION FOR INTENT ANALYSIS

(71) Applicant: Schlage Lock Company LLC, Carmel, IN (US)

(72) Inventors: Joseph Land, Danville, IN (US); David Brown, Greenwood, IN (US); Ryan C. Kincaid, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 470 days.

(21) Appl. No.: 17/850,955

(22) Filed: Jun. 27, 2022

(65) Prior Publication Data

US 2023/0417891 A1    Dec. 28, 2023

(51) Int. Cl.
*G01S 13/02* (2006.01)
*G01S 3/48* (2006.01)
(Continued)

(52) U.S. Cl.
CPC .......... *G01S 13/0209* (2013.01); *G01S 3/48* (2013.01); *G01S 5/04* (2013.01); *H04B 17/318* (2015.01);
(Continued)

(58) Field of Classification Search
CPC .......... G01S 13/0209; G01S 3/48; G01S 5/04; G01S 5/0221; G01S 5/0284;
(Continued)

(56) References Cited

U.S. PATENT DOCUMENTS

| 6,720,861 B1 | 4/2004 | Rodenbeck et al. |
| 8,319,605 B2 | 11/2012 | Hassan et al. |

(Continued)

FOREIGN PATENT DOCUMENTS

| CN | 102906360 A | 1/2013 |
| CN | 107945316 A | 4/2018 |

(Continued)

OTHER PUBLICATIONS

International Search Report, International Searching Authority, International Application No. PCT/US2023/026333, Jan. 3, 2024, 2 pages.

(Continued)

*Primary Examiner* — William Kelleher
*Assistant Examiner* — Ismaaeel A. Siddiquee
(74) *Attorney, Agent, or Firm* — Taft Stettinius & Hollister LLP

(57) ABSTRACT

A method according to an embodiment includes receiving UWB data indicative of a distance of a mobile device relative to the access control device and a SNR of signals received by a plurality of UWB antennas, inferring a side of the passageway at which the mobile device is located based on the distance of the mobile device relative to the access control device and also based on the SNR of the signals, estimating a travel time of the mobile device to the passageway based on the UWB data if the inferred side of the passageway based on the distance of the mobile device is different from the side of the passageway inferred based on the SNR of the signals, and determining the side of the passageway at which the mobile device is located to be an unsecure side of the passageway if the travel time exceeds a predefined threshold time.

20 Claims, 8 Drawing Sheets

(51) Int. Cl.

| | | |
|---|---|---|
| *G01S 5/04* | (2006.01) | |
| *G07C 9/00* | (2020.01) | |
| *H04B 17/318* | (2015.01) | |
| *H04W 64/00* | (2009.01) | |
| *G01S 5/02* | (2010.01) | |
| *G01S 7/00* | (2006.01) | |
| *G01S 13/76* | (2006.01) | |
| *G01S 13/88* | (2006.01) | |

(52) U.S. Cl.
CPC ........... *H04W 64/00* (2013.01); *G01S 5/0221* (2013.01); *G01S 5/0268* (2013.01); *G01S 5/0284* (2013.01); *G01S 7/006* (2013.01); *G01S 13/765* (2013.01); *G01S 13/88* (2013.01); *G07C 9/00309* (2013.01); *G07C 2209/63* (2013.01)

(58) Field of Classification Search
CPC ...... G01S 5/0268; G01S 7/006; G01S 13/765; G01S 13/88; H04B 17/318; H04W 64/00; G07C 9/00309; G07C 2209/63
See application file for complete search history.

(56) References Cited

U.S. PATENT DOCUMENTS

| | | | |
|---|---|---|---|
| 9,196,104 | B2 | 11/2015 | Dumas et al. |
| 9,218,696 | B2 | 12/2015 | Dumas et al. |
| 9,336,637 | B2 | 5/2016 | Neil et al. |
| 9,378,598 | B2 | 6/2016 | Dumas et al. |
| 9,512,643 | B1 | 12/2016 | Keefe |
| 9,970,229 | B1 | 5/2018 | Favila et al. |
| 10,453,281 | B1 | 10/2019 | Lopez et al. |
| 10,486,646 | B2 | 11/2019 | Ledvina et al. |
| 10,619,380 | B2 | 4/2020 | Ahearn et al. |
| 10,719,999 | B2 | 7/2020 | Love et al. |
| 10,759,389 | B2 | 9/2020 | Ledvina et al. |
| 10,760,332 | B2 | 9/2020 | Kincaid et al. |
| 11,562,609 | B2 | 1/2023 | Prostko et al. |
| 11,663,864 | B2 | 5/2023 | Kincaid et al. |
| 2002/0067259 | A1 | 6/2002 | Fufidio et al. |
| 2005/0046546 | A1 | 3/2005 | Masudava |
| 2006/0164208 | A1 | 7/2006 | Schaffzin et al. |
| 2009/0002246 | A1 | 1/2009 | Rabinovich et al. |
| 2010/0201482 | A1 | 8/2010 | Robertson et al. |
| 2012/0032850 | A1 | 2/2012 | Nakagawa et al. |
| 2012/0234058 | A1 | 9/2012 | Neil et al. |
| 2013/0176107 | A1 | 7/2013 | Dumas et al. |
| 2013/0237193 | A1 | 9/2013 | Dumas et al. |
| 2013/0241694 | A1 | 9/2013 | Sharma et al. |
| 2014/0148196 | A1 | 5/2014 | Bassan-Eskenazi et al. |
| 2014/0292481 | A1 | 10/2014 | Dumas et al. |
| 2015/0121465 | A1 | 4/2015 | Berns et al. |
| 2015/0213663 | A1 | 7/2015 | Dumas et al. |
| 2015/0309487 | A1 | 10/2015 | Lyman |
| 2016/0055692 | A1 | 2/2016 | Trani |
| 2016/0086400 | A1 | 3/2016 | Dumas et al. |
| 2016/0180620 | A1 | 6/2016 | Eyring et al. |
| 2016/0189453 | A1 | 6/2016 | Johnson et al. |
| 2016/0217638 | A1 | 7/2016 | Child et al. |
| 2016/0227362 | A1 | 8/2016 | Howard et al. |
| 2016/0307385 | A1 | 10/2016 | Arfwedson et al. |
| 2016/0332598 | A1 | 11/2016 | Ghabra et al. |
| 2016/0337863 | A1 | 11/2016 | Robinson et al. |
| 2016/0350992 | A1 | 12/2016 | Telljohann et al. |
| 2017/0303090 | A1 | 10/2017 | Stitt et al. |
| 2017/0323093 | A1 | 11/2017 | Liu et al. |
| 2017/0372542 | A1 | 12/2017 | Romero et al. |
| 2018/0052217 | A1 | 2/2018 | Jonsson |
| 2018/0056939 | A1 | 3/2018 | van Roermund et al. |
| 2018/0102008 | A1 | 4/2018 | Dupart et al. |
| 2018/0162321 | A1 | 6/2018 | Spiess |
| 2018/0242105 | A1 | 8/2018 | Sute |
| 2018/0315262 | A1 | 11/2018 | Love et al. |
| 2020/0168017 | A1 | 5/2020 | Prostko et al. |
| 2020/0314651 | A1* | 10/2020 | Pirch .................. G07C 9/21 |
| 2021/0074093 | A1* | 3/2021 | Love .................. G07C 9/00309 |
| 2021/0158637 | A1* | 5/2021 | Kincaid ............. G07C 9/00309 |
| 2021/0295625 | A1* | 9/2021 | Ljung ................ G07C 9/00309 |
| 2021/0365541 | A1 | 11/2021 | Ohashi et al. |
| 2023/0010267 | A1 | 1/2023 | Kincaid et al. |
| 2023/0053526 | A1* | 2/2023 | Horne ................ G07C 9/00309 |
| 2023/0213637 | A1 | 7/2023 | Brown et al. |

FOREIGN PATENT DOCUMENTS

| | | |
|---|---|---|
| EP | 2930071 A1 | 10/2015 |
| WO | 2014155255 A1 | 10/2014 |
| WO | 2016177666 A1 | 11/2016 |
| WO | 2017180563 A1 | 10/2017 |
| WO | 2017180688 A1 | 10/2017 |
| WO | 2018071671 A2 | 4/2018 |
| WO | 2020083750 A1 | 4/2020 |
| WO | 2020193566 A1 | 10/2020 |

OTHER PUBLICATIONS

Written Opinion of the International Searching Authority, International Searching Authority, International Application No. PCT/US2023/026333, Jan. 3, 2024, 4 pages.

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB To Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction As A Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

(56) References Cited

OTHER PUBLICATIONS

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.

Front Page—Decawave; Decawave; retrieved on Jan. 13, 2021; https://www.decawave.com/; 5 pages.

\* cited by examiner

UWB-BASED SIDE OF DOOR DETECTION FOR INTENT ANALYSIS

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, or token device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is directed to a unique system, components, and methods for UWB-based side of door detection for intent analysis. Other embodiments are directed to apparatuses, systems, devices, hardware, methods, and combinations thereof for UWB-based side of door detection for intent analysis.

According to an embodiment, a method may include receiving, from an ultra wideband (UWB) subsystem of an access control device that secures a passageway, UWB data indicative of a distance of a mobile device relative to the access control device and a signal-to-noise ratio (SNR) of signals received by a plurality of UWB antennas of the UWB subsystem, inferring, by the access control device, a side of the passageway at which the mobile device is located based on the distance of the mobile device relative to the access control device, inferring, by the access control device, a side of the passageway at which the mobile device is located based on the SNR of the signals, estimating, by the access control device, a travel time of the mobile device to the passageway based on the UWB data in response to determining that the side of the passageway inferred based on the distance of the mobile device relative to the access control device is different from the side of the passageway inferred based on the SNR of the signals, and determining, by the access control device, the side of the passageway at which the mobile device is located to be an unsecure side of the passageway in response to the travel time exceeding a predefined threshold time.

In some embodiments, the UWB data may include received signal strength indicator (RSSI) data indicative of the distance of the mobile device relative to the access control device.

In some embodiments, estimating the travel time of the mobile device to the passageway may include determining a velocity of the mobile device.

In some embodiments, estimating the travel time of the mobile device to the passageway may include determining an angle of arrival of the mobile device.

In some embodiments, the method may further include determining, by the access control device, the side of the passageway at which the mobile device is located to be the unsecure side of the passageway in response to determining that the side of the passageway inferred based on the distance of the mobile device relative to the access control device is the unsecure side and the side of the passageway inferred based on the SNR of the signals is the unsecure side.

In some embodiments, the method may further include determining, by the access control device, the side of the passageway at which the mobile device is located to be a secure side of the passageway in response to determining that the side of the passageway inferred based on the distance of the mobile device relative to the access control device is the secure side and the side of the passageway inferred based on the SNR of the signals is the secure side.

In some embodiments, the method may further include unlocking, by the access control device, a lock mechanism associated with the access control device in response to inferring ingress intent of a user of the mobile device and determining that the mobile device is at the unsecure side of the passageway.

According to another embodiment, an access control device may include a plurality of UWB antennas and configured to perform a ranging session with a mobile device and generate UWB data indicative of a distance of the mobile device relative to the access control device and a signal-to-noise ratio (SNR) of signals received by the plurality of UWB antennas, a processor, and a memory comprising a plurality of instructions stored thereon that, in response to execution by the processor, causes the processor to infer a side of the passageway at which the mobile device is located based on the distance of the mobile device relative to the access control device, infer a side of the passageway at which the mobile device is located based on the SNR of the signals, estimate a travel time of the mobile device to the passageway based on the UWB data in response to a determination that the side of the passageway inferred based on the distance of the mobile device relative to the access control device is different from the side of the passageway inferred based on the SNR of the signals, and determine the side of the passageway at which the mobile device is located to be an unsecure side of the passageway in response to the travel time exceeding a predefined threshold time.

In some embodiments, the UWB data may include received signal strength indicator (RSSI) data indicative of the distance of the mobile device relative to the access control device.

In some embodiments, to estimate the travel time of the mobile device to the passageway may include to determine a velocity of the mobile device.

In some embodiments, to estimate the travel time of the mobile device to the passageway may include to determine an angle of arrival of the mobile device.

In some embodiments, the plurality of instructions may further cause the processor to determine the side of the passageway at which the mobile device is located to be the unsecure side of the passageway in response to determinations that the side of the passageway inferred based on the distance of the mobile device relative to the access control device is the unsecure side and the side of the passageway inferred based on the SNR of the signals is the unsecure side.

In some embodiments, the plurality of instructions may further cause the processor to determine the side of the passageway at which the mobile device is located to be a secure side of the passageway in response to determinations that the side of the passageway inferred based on the distance of the mobile device relative to the access control device is the secure side and the side of the passageway inferred based on the SNR of the signals is the secure side.

In some embodiments, the access control device may further include a lock mechanism configured to unlock in response to inferred ingress intent of a user of the mobile device and a determination that the mobile device is at the unsecure side of the passageway.

In some embodiments, the access control device may further include a credential reader.

According to yet another embodiment, an access control system may include a mobile device, an ultra wideband (UWB) subsystem comprising a plurality of UWB antennas and configured to perform a ranging session with a mobile device and generate UWB data indicative of a distance of the mobile device relative to a passageway and a signal-to-noise ratio (SNR) of signals received by the plurality of UWB antennas, a processor, and a memory comprising a plurality of instructions stored thereon that, in response to execution by the processor, causes the processor to infer a side of the passageway at which the mobile device is located based on the distance of the mobile device relative to the UWB subsystem, infer a side of the passageway at which the mobile device is located based on the SNR of the signals, estimate a travel time of the mobile device to the passageway based on the UWB data in response to a determination that the side of the passageway inferred based on the distance of the mobile device relative to the UWB subsystem is different from the side of the passageway inferred based on the SNR of the signals, and determine the side of the passageway at which the mobile device is located to be an unsecure side of the passageway in response to the travel time exceeding a predefined threshold time.

In some embodiments, the UWB data may include received signal strength indicator (RSSI) data indicative of the distance of the mobile device relative to the UWB subsystem.

In some embodiments, to estimate the travel time of the mobile device to the passageway may include to determine a velocity of the mobile device.

In some embodiments, the plurality of instructions may further cause the processor to determine the side of the passageway at which the mobile device is located to be the unsecure side of the passageway in response to determinations that the side of the passageway inferred based on the distance of the mobile device relative to the UWB subsystem is the unsecure side and the side of the passageway inferred based on the SNR of the signals is the unsecure side.

In some embodiments, the plurality of instructions may further cause the processor to determine the side of the passageway at which the mobile device is located to be a secure side of the passageway in response to determinations that the side of the passageway inferred based on the distance of the mobile device relative to the UWB subsystem is the secure side and the side of the passageway inferred based on the SNR of the signals is the secure side.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
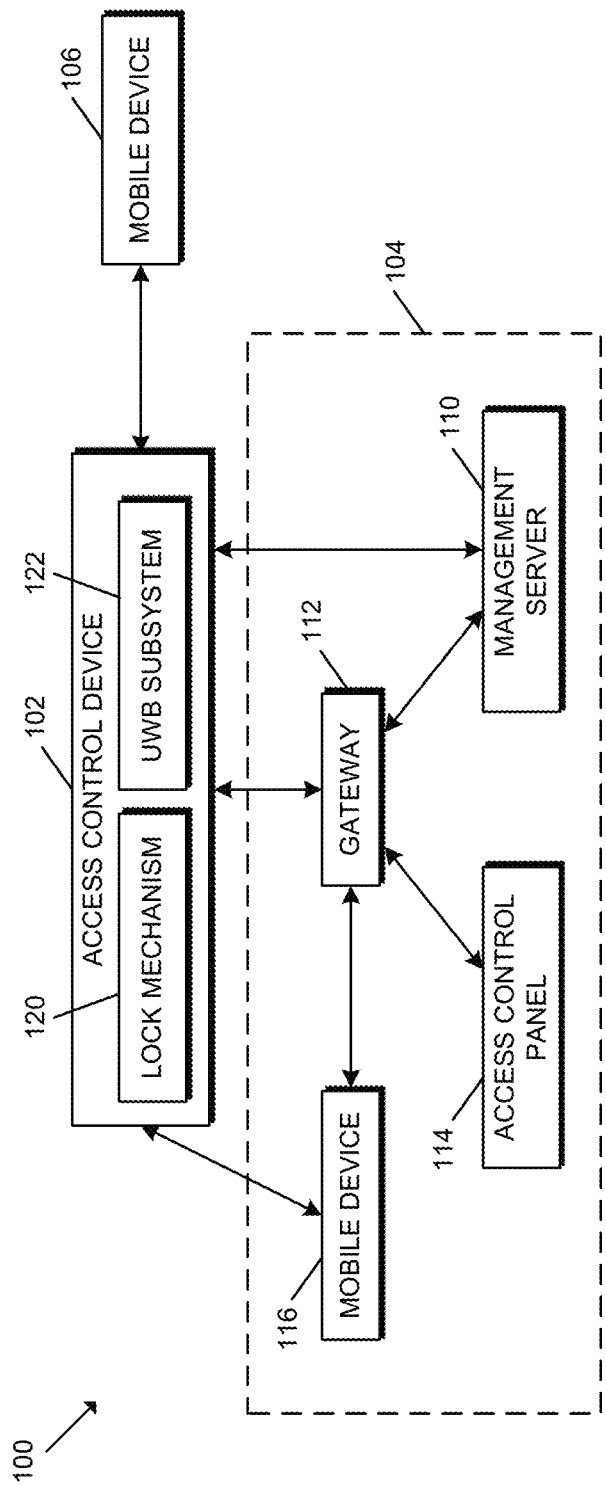
FIG. 1 is a simplified block diagram of at least one embodiment of an access control system for ultra wideband-based side of door detection for intent analysis.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Seamless access control systems have a "peephole problem" with intent analysis in that a user with an authorized access credential may approach an access control device 102 from the interior/secure side of a door (e.g., from the inside of a residence), for example, to look out of a "peep hole" in the door or for other purposes to see who is at a door. Without having knowledge of the side of the door at which the user is located, the access control device 102 may automatically unlock due to recognizing that an authorized user was within a threshold of entry of the door. However, this would allow for a potentially unwanted visitor to gain access without proper access credentials. As such, there is a need for improved accuracy in side of door detection by the access control device 102, such that the door remains locked when approached by an authorized user from the interior/secure side of the door. It should be appreciated that accurate knowledge of user location relative to the side of the access control device 102 can also be used to trigger other events. For example, after an unlock event, knowing with a high degree of confidence that the user is now located on the inside of the door can trigger an automatic door re-lock. Additionally, knowledge of the location (inside or outside) could trigger other smart phone function, such as turning lighting on or off.

Referring now to FIG. 1, in the illustrative embodiment, an access control system 100 for ultra wideband (UWB)-based side of door detection for intent analysis is shown. The illustrative access control system 100 includes an access control device 102, a management system 104, and a mobile device 106. Further, the management system 104 may include a management server 110, a gateway device 112, an access control panel 114, and/or a mobile device 116. Further, as shown, the illustrative access control device 102 includes a lock mechanism 120 and a UWB subsystem 122. However, in other embodiments, it should be appreciated that the access control device 102 may be embodied as a UWB accessory device configured to perform or facilitate the UWB-based intent detection described herein, which may be communicatively coupled to an electronic lock including a lock mechanism (e.g., such as the lock mechanism 120).

As described in detail below, the access control device 102 may control and/or facilitate access to a passageway (e.g., through a doorway) via a lock mechanism 120 based on an intent of the user of a mobile device 106 (e.g., a UWB-capable smartphone) inferred based on UWB communication signals received from the mobile device 106. In particular, the access control device may receive UWB data from the UWB subsystem 122 related to a UWB ranging session with the mobile device 106 and indicative of a distance of the mobile device 106 from the access control device 102 (e.g., via received signal strength indicator (RSSI) values), an angle of arrival (AoA) of UWB signals received from the mobile device 106, a signal-to-noise ratio (SNR) of UWB signals received from the mobile device 106, and/or other parameters related to the UWB communication signals and/or ranging session.

As described below, the access control device 102 may perform various analyses on the UWB data to determine whether the user of the mobile device 106 is on an unsecure side of the passageway (e.g., an exterior side) or a secure side of the passageway (e.g., an interior side). In particular, in the illustrative embodiment, the access control device 102 may utilize RSSI values and SNR values as cross-checks on the location of the mobile device 106. For example, if both the RSSI values and the SNR values indicate that the mobile device 106 is on the same side of the passageway (i.e., secure or unsecure), the access control device 102 accepts that inference. However, if analysis of the RSSI values and the SNR values results in disagreement regarding the side of the passageway, the access control device 102 may further estimate the travel time of the mobile device 106 to the passageway (e.g., based on the velocity, AoA, and/or other parameters of the mobile device 106). If the travel time exceeds a predefined threshold, the access control device 102 treats the mobile device 106 as if the mobile device 106 has remained on the same side, as it would not be physically possible for the mobile device 106 to have traveled to the other side. Otherwise, the access control device 102 treats the determination as being indeterminate or unknown, and may pause the analysis until additional UWB data is received for analysis. In some embodiments, if ingress intent is inferred (e.g., based on additional considerations) and the mobile device 106 is determined to be at the unsecure side of the passageway, the access control device 102 may automatically control the lock mechanism 120 without requiring user input or a physical action by the user (e.g., to unlock the lock mechanism 120).

It should be appreciated that the access control device 102, the management system 104, the mobile device 106, the management server 110, the gateway device 112, the access control panel 114, and/or the mobile device 116 may be embodied as any type of device or collection of devices suitable for performing the functions described herein.

More specifically, in the illustrative embodiment, the access control device 102 may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door operator, an auto-operator, a motorized latch/bolt (e.g., for a sliding door), a barrier control device (e.g., battery-powered), or a peripheral controller of a barrier to a passageway. Accordingly, in some embodiments, the access control device 102 may include a lock mechanism 120 configured to be positioned in a locked state in which access to the passageway is denied, or positioned in an unlocked state in which access to the passageway is permitted. In some embodiments, the lock mechanism 120 includes a deadbolt, latch bolt, lever, and/or other mechanism adapted to move between the locked and unlocked state and otherwise perform the functions described herein. However, it should be appreciated that the lock mechanism 120 may be embodied as any another mechanism suitable for controlling access through a passageway in other embodiments.

Depending on the particular embodiment, the access control device 102 may include a credential reader or be electrically/communicatively coupled to a credential reader configured to communicate with the mobile device 106 and/or other credential devices. In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the management server 110).

As described herein, the access control device 102 includes a UWB subsystem 122 for performing UWB ranging with other UWB-capable devices (e.g., the mobile device 106). In the illustrative embodiment, the UWB subsystem 122 includes a plurality of UWB antennas for wireless communication using UWB technology (e.g., using the IEEE 802.15.4 (wireless) standard). It should be appreciated that a UWB signal may be received by a plurality of UWB antennas, and the UWB subsystem 122 of the access control device 102 may calculate or estimate the distance (e.g., via ToF) of the mobile device 106, angle of arrival of the mobile device 106 (e.g., based on an angle of arrival of the UWB signal), signal strength (e.g., RSSI), and/or SNR based on the received UWB signal. In some embodiments, it should be appreciated that signal strength (e.g., RSSI) may serve as a proxy for the distance of the mobile device 106 relative to the access control device 102. It should be further appreciated that the number, size, and/or arrangement of UWB antennas of the UWB subsystem 122 may vary depending on the particular embodiment. Further, it should be appreciated that the access control device 102 may also include other wireless communication circuitry for communicating with the mobile device 106 and/or other devices via corresponding protocols (e.g., Wi-Fi, Bluetooth (e.g., including BLE), Zigbee, Z-Wave, Near Field Communication (NFC), Thread, etc.).

Figure 5:
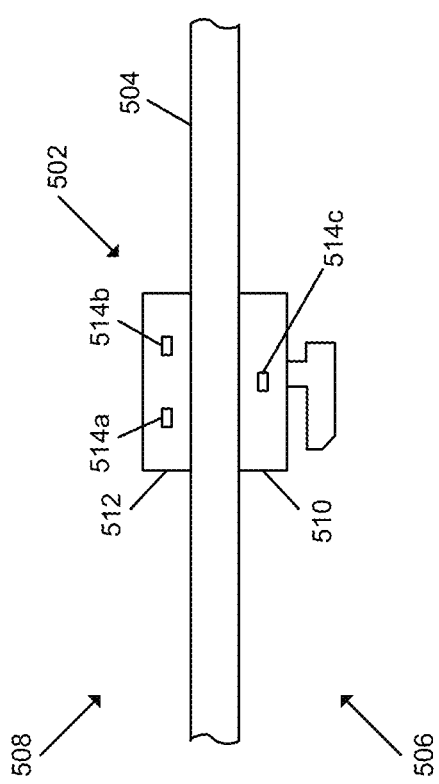
FIG. 5 is a simplified illustration of spatial relationships of various components in at least one embodiment of an access control device.

Referring now to FIG. 5, in some embodiments, the access control device 102 may be embodied as an electronic lock similar to the electronic lock 502 of FIG. 5, which is secured to a door 504 and configured to control passage through the door 504. It should be appreciated that the door 504 has a secure side 506 (e.g., an interior side of a perimeter door) and an unsecure side 508 (e.g., an exterior side of a perimeter door). Further, as shown, the illustrative electronic lock 502 has a housing defined at least in part by an interior escutcheon 510 configured to be secured at or to a secure side 506 of the door 504 and an exterior escutcheon 512 configured to be secured at or to an unsecure side 508 of the door 504. In the illustrative embodiment, the electronic lock 502 includes two UWB antennas 514 (specifically, UWB antennas 514a, 514b) positioned within (e.g., mounted within) the exterior escutcheon 512, and one UWB antenna 514 (specifically, UWB antenna 514c) positioned within (e.g., mounted within) the interior escutcheon 510. It should be appreciated that, in some embodiments, the UWB antennas 514a, 514b may be mounted on or otherwise secured to a printed circuit board assembly (PCBA) positioned within (e.g., mounted within) the exterior escutcheon 512 and/or the UWB antenna 514c may be mounted on or otherwise secured to a PCBA positioned within (e.g., mounted within) the interior escutcheon 510. In some embodiments, the UWB antennas 514 may form a portion of a UWB subsystem such as the UWB subsystem 122 of FIG. 1.

Figure 6:
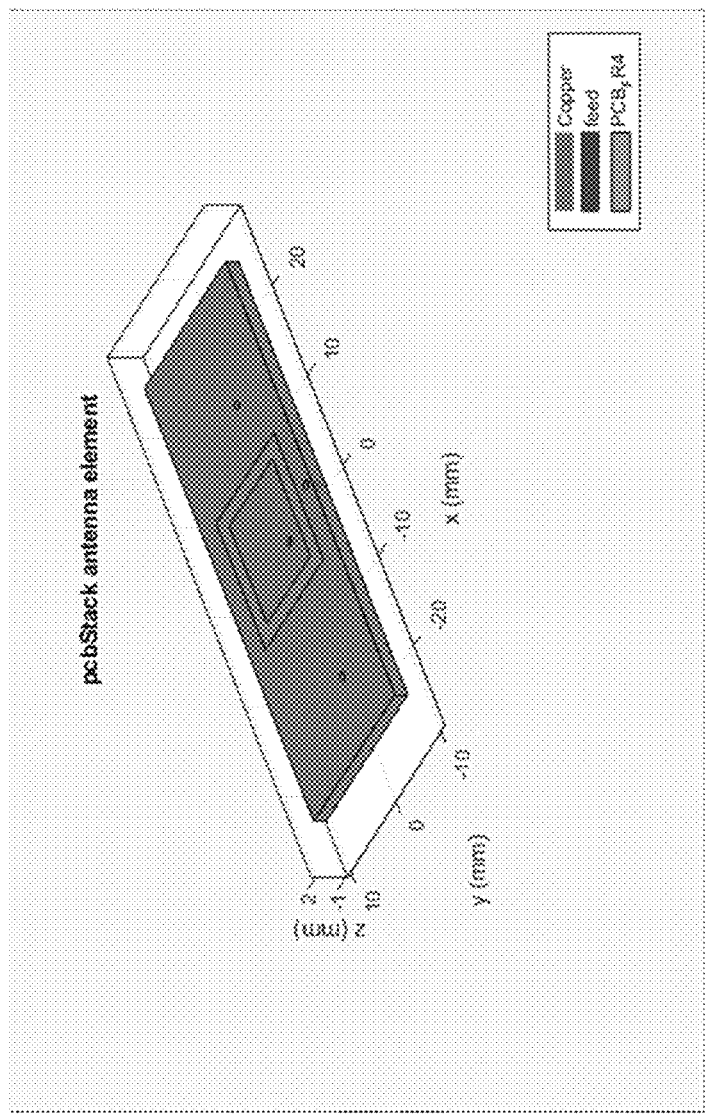
FIG. 6 is a diagram of at least one embodiment of a UWB antenna positioned in a secure side of an access control device.
Figure 8:
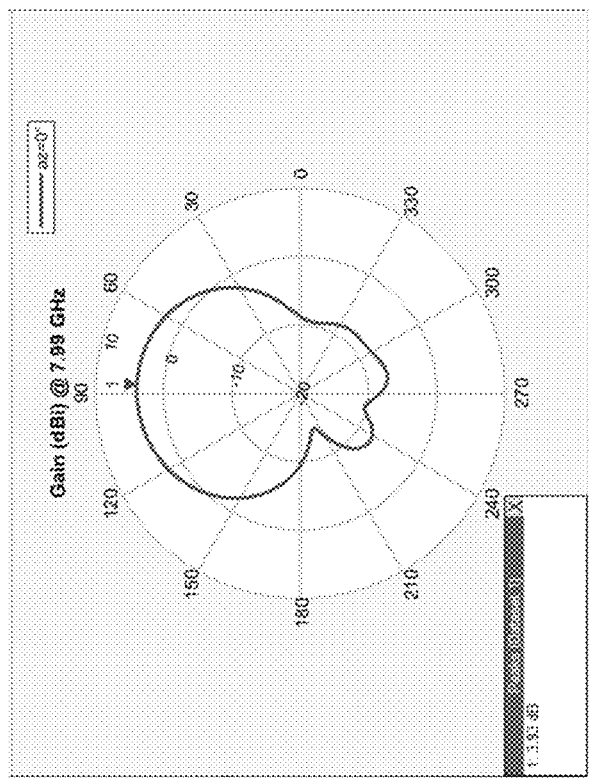
FIG. 8 illustrates a measured polar response of UWB antennas of at least one embodiment of a UWB subsystem.
Figure 7:
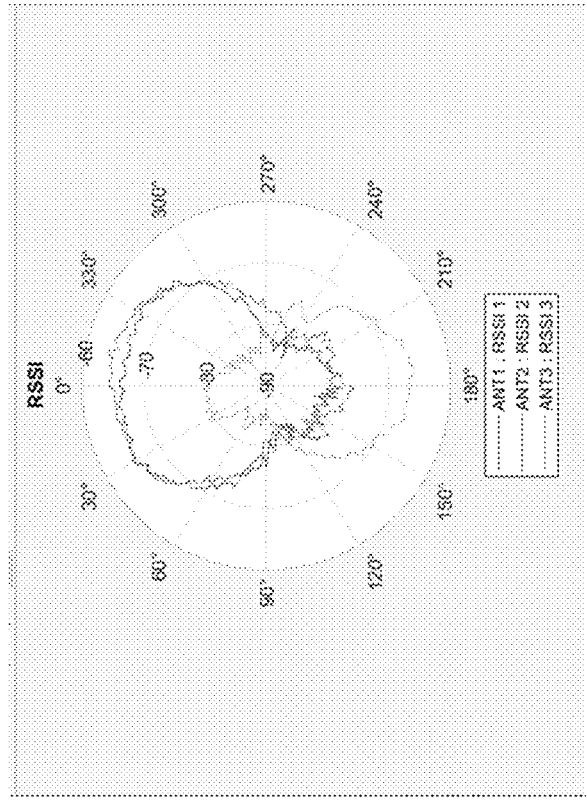
FIG. 7 illustrates a simulated polar pattern of the UWB antenna of FIG. 6.
Figure 10:
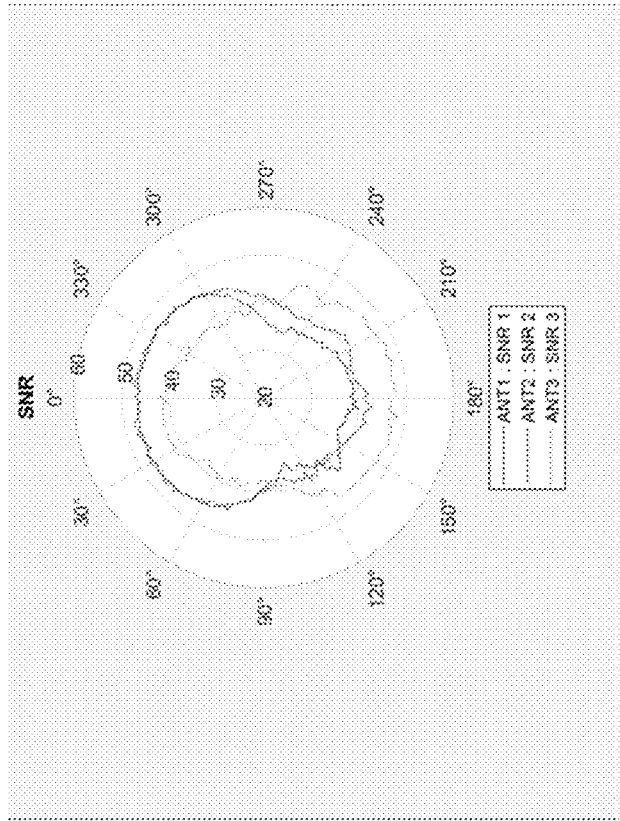
FIG. 10 illustrates measured signal-to-noise ratio (SNR) values of UWB antennas of at least one embodiment of a UWB subsystem.
Figure 9:
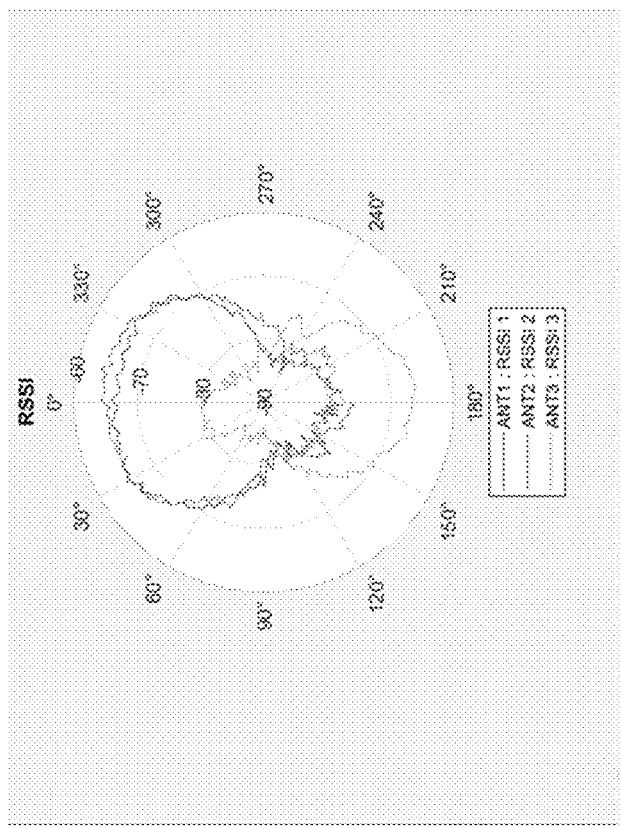
FIG. 9 illustrates measured received signal strength indicator (RSSI) values of UWB antennas of at least one embodiment of a UWB subsystem.

In some embodiments, the UWB antenna 514c may be embodied as a patch antenna similar to the patch antenna depicted in FIG. 6, which has a narrow antenna polar pattern centered on the secured side of the electronic lock 502 as depicted in FIG. 7. It should be appreciated that, in such embodiments, the measured polar response of the UWB antennas 514 may be similar to the response depicted in FIG. 8. Additionally, FIG. 9 illustrates measured RSSI values of the UWB antennas 514 in a particular embodiment, and FIG. 10 illustrates measured SNR values of the UWB antennas 514 in a particular embodiment. It should be appreciated that the two unsecure side UWB antennas 514a, 514b positioned close to one another in the azimuth provide distance data, AoA data, RSSI data, SNR data, and/or other relevant UWB data. Similarly, the secure side UWB antenna 514c provides at least RSSI and SNR data. Accordingly, the combination of fields provides additional accurate information that may be used by the electronic lock 502 as described herein to determine the side of door of the mobile device 106.

Although the escutcheons and sides are described herein with reference to "interior" and "exterior," it should be appreciated that such terminology is used simply for convenience and brevity of the description. For example, in some embodiments, both sides of the door 504 may be interior in the sense that both sides of the door 504 are within the perimeter of a building (e.g., as for a wholly interior door). Additionally, although the illustrative embodiment depicts the electronic lock 502 as being secured to the door 504, it should be appreciated that the electronic lock 502 (or other embodiment of the access control device 102) may be secured to a different structure in other embodiments (e.g., the door frame, a wall, etc.). For example, in some embodiments, the access control device 102 may be embodied as a wall-mounted reader or peripheral controller.

The illustrative electronic lock 502 includes a lock mechanism similar to the lock mechanism 120 described above in reference to FIG. 1. In particular, the lock mechanism may include a deadbolt, latch bolt, lever, and/or other mechanism that may be positioned in a locked state to secure the door 504 and prevent passage through the door 504 (i.e., when the door 504 is closed) or may be positioned in an unlocked state to allow passage through the door 504. Further, in some embodiments, the electronic lock 502 may include a wire harness that extends through at least a portion of the door 504 and electrically couples various electronic components of the electronic lock 502 to one another. For example, the wire harness 332 may form a portion of circuitry that includes the UWB antennas 514, the lock mechanism, and/or other components of the electronic lock 502 depending on the particular embodiment.

Referring back to FIG. 1, in the illustrative embodiment, the mobile device 106 may be embodied as any mobile device capable of communicating with the access control device 102 via UWB signals (e.g., for UWB ranging), exchanging credential information with the access control device 102, and/or otherwise performing the functions described herein. Accordingly, in some embodiments, in addition to having UWB communication circuitry, it should be appreciated that the mobile device 106 may also include other wireless communication circuitry for communicating with the access control device 102 and/or other devices via corresponding protocols (e.g., Wi-Fi, Bluetooth (e.g., including BLE), Zigbee, Z-Wave, Near Field Communication (NFC), Thread, etc.). It should be appreciated that, in some embodiments, the mobile device 106 may be embodied as a smartphone, UWB fob, or UWB tag device.

As described herein, in some embodiments, the mobile device 106 may be configured to perform the one or more of the functions described herein (see, for example, the method 300 of FIGS. 3-4) in addition to or in the alternative to the access control device 102. Further, in some embodiments, the mobile device 106 may leverage sensor data to validate various data and/or otherwise improve the accuracy of the functions described herein. In particular, in some embodiments, the mobile device 106 may include an inertial measurement unit (IMU) including, for example, an accelerometer, gyroscope, and/or magnetometer that generates inertial data associated with the mobile device 106, which may be used to verify the velocity/heading of the mobile device 106. In other embodiments, the mobile device 106 may include environmental sensors (e.g., temperature sensors, air pressure sensors, humidity sensors, light sensors, etc.), inertial sensors (e.g., accelerometers, gyroscopes, etc.), magnetometers, proximity sensors, optical sensors, electromagnetic sensors, audio sensors (e.g., microphones), motion sensors, cameras, piezoelectric sensors, pressure sensors, switches (e.g., reed switches), and/or other types of sensors.

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the mobile device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the mobile device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one mobile device 106, one management server 110, one gateway device 112, one access control panel 114, and one mobile device 116 are shown in the illustrative embodiment of FIG. 1, the system 100 may include multiple access control devices 102, management systems 104, mobile devices 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate mobile devices 106 in some embodiments.

Figure 2:
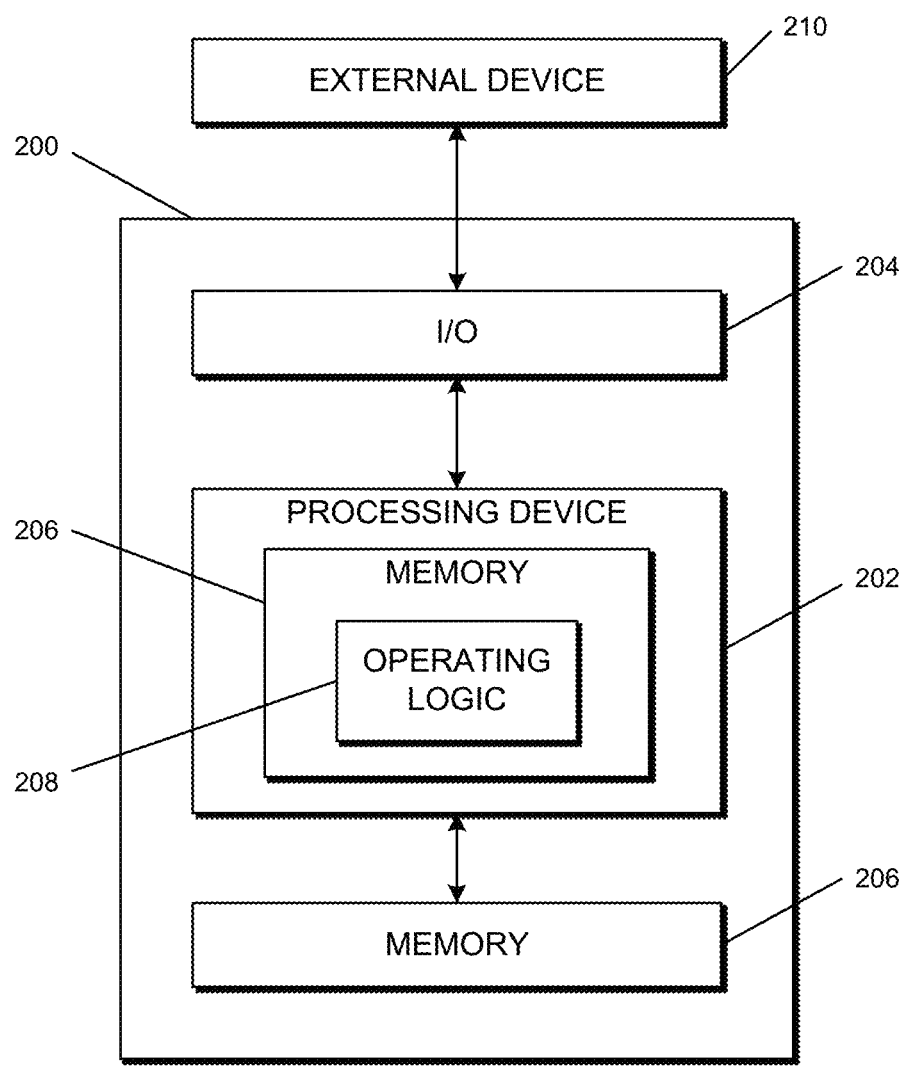
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an access control device, mobile device, management server, gateway device, and/or access control panel that may be utilized in connection with the access control device 102, the management system 104, the mobile device 106, the management server 110, the gateway device 112, the access control panel 114, and/or the mobile device 116 illustrated in FIG. 1. Depending on the particular embodiment, computing device 200 may be embodied as a reader device, credential device, access control device, UWB-capable device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the mobile device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
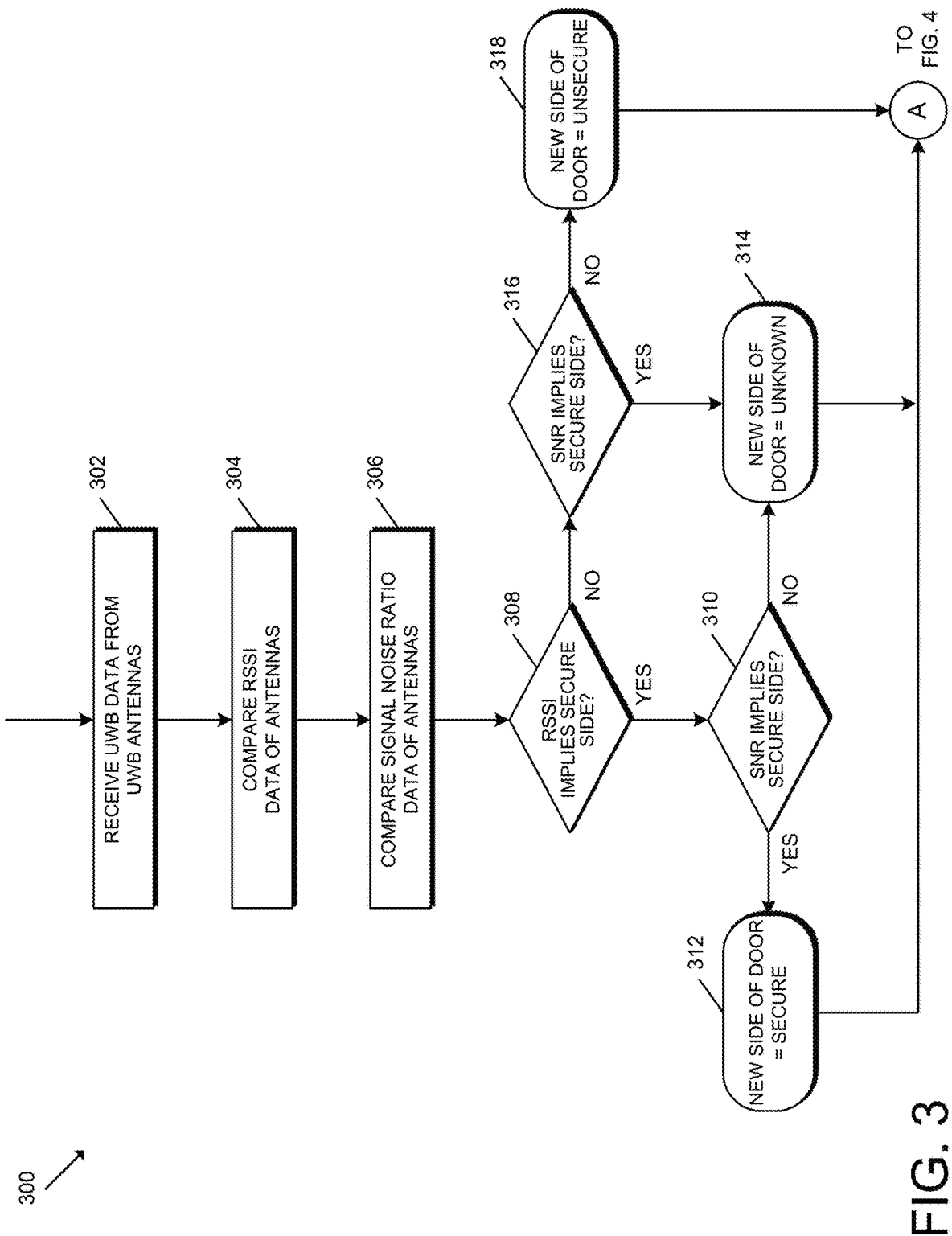
FIGS. 3-4 are a simplified flow diagram of at least one embodiment of a method for ultra wideband-based side of door detection for intent analysis.
Figure 4:
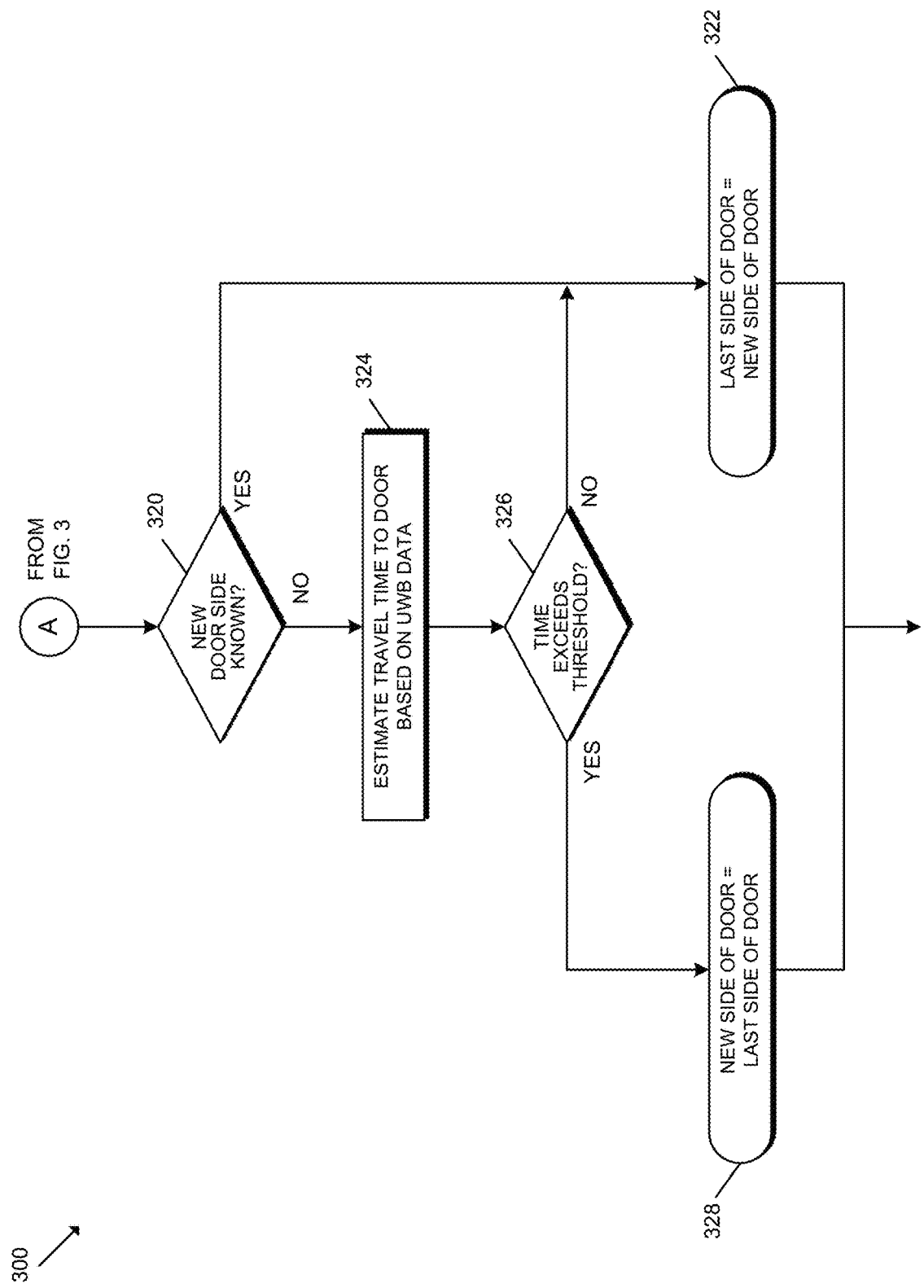

Referring now to FIGS. 3-4, in use, the access control device 102 may execute (e.g., in firmware) a method 300 for UWB-based side of door detection for intent analysis. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 of FIG. 3 in which the access control device 102 receives UWB data from the UWB subsystem 122 (e.g., the UWB antennas) of the access control device 102 (e.g., associated with a UWB ranging session between the access control device 102 and the mobile device 106). In particular, the UWB data may be indicative of a distance of the mobile device 106 relative to the access control device 102 (e.g., time of flight), an angle of arrival of the mobile device 106 (e.g., based on an angle of arrival of a UWB signal received from the mobile device 106), a signal-to-noise ratio (SNR) of the UWB signal received from the mobile device 106, a signal strength (e.g., RSSI) of the UWB signal received from the mobile device 106, non-line-of-sight (NLOS) data, and/or other characteristics. Although described in the singular for convenience and brevity of the description, it should be appreciated that the UWB data may include multiples of the UWB data in various embodiments (e.g., multiple distance, SNR, and/or RSSI measurements). In an embodiment, the UWB subsystem 122 may calculate the relative distance of the mobile device 106 using at least two front-facing antennas (e.g., the UWB antennas 514*a*, 514*b*), the angle of arrival of the mobile device 106 using at least two front-facing antennas (e.g., the UWB antennas 514*a*, 514*b*), the velocity of the mobile device 106 (e.g., based on a change in distance over time), the SNR of signals received from the mobile device 106 using both the front-facing antennas (e.g., the UWB antennas 514*a*, 514*b*) and the back-facing antennas (e.g., the UWB antenna 514*c*), and the RSSI of signals received from the mobile device 106 using both the front-facing antennas (e.g., the UWB antennas 514*a*, 514*b*) and the back-facing antennas (e.g., the UWB antenna 514*c*). It should be appreciated that the access control device 102 may periodically receive UWB data from the UWB subsystem 122 (e.g., during the ranging session based on periodic signal transmissions). For example, in some embodiments, the access control device 102 receives new UWB every 100 ms or every 200 ms.

In block 304, the access control device 102 compares the RSSI data (or other signal strength) of the UWB antennas of the UWB subsystem 122 to determine whether the RSSI data (or other signal strength data) is indicative of the mobile device 106 (and therefore the user of the mobile device 106) being located on the secure side of the passageway or the unsecure side of the passageway. For example, if the signal strength of the UWB signal received at the secure side is greater than the signal strength of the UWB signal received at the unsecure side, the access control device 102 determines that the RSSI data is indicative of the mobile device 106 being located on the secure side of the passageway. However, if the signal strength of the UWB signal received at the unsecure side is greater than the signal strength of the UWB signal received at the secure side, the access control device 102 determines that the RSSI data is indicative of the mobile device 106 being located on the unsecure side of the passageway. It should be appreciated that the access control device 102 may select which unsecure side RSSI data to used based on any suitable technique or algorithm. For example, in some embodiments, the access control device 102 selects the RSSI data for the unsecure side UWB antenna having the greatest signal strength. In other embodiments, the access control device 102 may compute an average or other value based on the RSSI data for multiple (e.g., all) of the unsecure side UWB antennas. It should be further appreciated that RSSI data and/or other signal strength data may serve as a proxy for the relative distance of the mobile device 106. Accordingly, in other embodiments, the access control device 102 may utilize other UWB data (e.g., time of flight data) to determine the distance of the mobile device 106 relative to the access control device 102 and infer side of passageway/door based on that distance data.

In block 306, the access control device 102 compares the SNR data of the UWB antennas of the UWB subsystem 122 to determine whether the SNR data implies or is otherwise indicative of the mobile device 106 (and therefore the user of the mobile device 106) being located on the secure side of the passageway or the unsecure side of the passageway. For example, it should be appreciated that the greater the signal, the more likely that the transmitter is directly in front of the receiving antenna. Like with the RSSI data, it should be appreciated that the access control device 102 may select which unsecure side UWB antenna SNR data to use based on any suitable technique or algorithm.

In block 308, the access control device 102 determines whether the RSSI data is indicative of the mobile device 106 being on the secure side of the passageway (e.g., with secure side signal strength being greater than unsecure side signal strength). If so, the method 300 advances to block 310 in which the access control device 102 determines whether the SNR data is indicative of the mobile device 106 being on the secure side of the passageway. If so, the method 300 advances to block 312 and the access control device 102 determines the side of the passageway at which the mobile device 106 is located to be the secure side of the passageway. Further, the access control device 102 may assign (e.g., in firmware) a "New Side of Door" variable to be "Secure." However, if in block 310, the access control device 102 determines that the SNR data is not indicative of the mobile device 106 being on the secure side of the passageway (i.e., the SNR data is indicative of the mobile device 106 being on the unsecure side of the passageway), the method 300 advances to block 314 in which the access control device 102 determines the side of the passageway to be unknown. Further, the access control device 102 may assign (e.g., in firmware) the "New Side of Door" variable to be "Unknown."

Returning to block 308, if the access control device 102 determines the RSSI data not to be indicative of the mobile device 106 being on the secure side of the passageway (i.e., the RSSI data is indicative of the mobile device 106 being on the unsecure side of the passageway), the method 300 advances to block 316 in which the access control device 102 determines whether the SNR data is indicative of the mobile device 106 being on the secure side of the passageway. If so, the method 300 advances to block 314 in which the access control device 102 determines the side of the passageway to be unknown. Further, the access control device 102 may assign (e.g., in firmware) the "New Side of Door" variable to be "Unknown." However, if in block 316, the access control device 102 determines that the SNR data is not indicative of the mobile device 106 being on the secure side of the passageway (i.e., the SNR data is indicative of the mobile device 106 being on the unsecure side of the passageway), the method 300 advances to block 318 in which the access control device 102 determines the side of the passageway at which the mobile device 106 is located to be the unsecure side of the passageway. Further, the access control device 102 may assign (e.g., in firmware) the "New Side of Door" variable to be "Unsecure."

In other words, if the analyses of both the RSSI data and the SNR data indicate that the mobile device 106 is on the secure side of the passageway, then the access control device 102 determines that the mobile device 106 is on the secure side and sets the new state of the door to "secure." Similarly, if the analyses of both the RSSI data and the SNR data indicate that the mobile device 106 is on the unsecure side of the passageway, then the access control device 102 determines that the mobile device 106 is on the unsecure side and sets the new state of the door to "unsecure." However, if the analyses of the RSSI data and the SNR data differ in their conclusions regarding the side of door at which the mobile device 106 is located, the access control device 102 finds the analyses to be inconclusive and sets the new state of the door to "Unknown." It should be appreciated that, if the side of door/passageway determination is unknown, the access control device 102 may rely on other parameters in order to infer at which side of the passageway the mobile device 106 is located as described below.

The method 300 advances from blocks 312, 314, 318 to block 320 of FIG. 4 in which the access control device 102 determines whether the new door side is known. If so, the method 300 advances to block 322 in which the access control device 102 assigns (e.g., in firmware) the "Last Side of Door" variable to be the value for the "New Side of Door." For example, if the new side of the door was determined to be "Secure," then that value is assigned to the "Last Side of Door" variable. If the access control device 102 determines that the new door side is unknown, the method 300 advances to block 324 in which the access control device 102 estimates a travel time of the mobile device 106 to the door based on the UWB data. For example, the access control device 102 may determine the distance, velocity, angle of arrival, and/or other inertial characteristics of the mobile device 106 based on the UWB data.

In block 326, the access control device 102 determines whether the estimated travel time exceeds (or is at least) a predefined threshold time. It should be appreciated that the threshold time may be associated with the amount of time over which it is possible for the user to reach the door threshold or passageway (e.g., two seconds), and the threshold time may be predefined or configurable. If the access control device 102 determines that the estimated travel time exceeds that predefined threshold time, the method 300 advances to block 328 in which the access control device 102 assigns (e.g., in firmware) the "New Side of Door" variable to be the value for the "Last Side of Door." In other words, the access control device 102 assumes that the side of door state of the mobile device 106 and, therefore, of the user could not have changed and therefore must remain the same. However, if the access control device 102 determines that the estimated travel time does not exceed the predefined threshold time, the method 300 advances to block 322 in which the access control device 102 assigns (e.g., in firmware) the "Last Side of Door" variable to the value of the "New Side of Door" variable, which is "Unknown."

Although the blocks 302-328 are described in a relatively serial manner, it should be appreciated that various blocks of the method 300 may be performed in parallel in some embodiments.

Although the techniques described herein are primarily in reference to two-dimensional calculations, it should be appreciated that the three-dimensional data may be used in some embodiments. For example, in some circumstances, the elevation of the mobile device 106 may skew the data as used herein. Accordingly, in some embodiments, the access control device 102 may project a three-dimensional data point to two-dimensional space (e.g., the plane of the access control device 102 extending outward horizontally) or otherwise convert three-dimensional data points to two-dimensional data points in order to provide further robustness (e.g., during and/or after the calibration phase described herein).

Described in the context of a more robust intent detection algorithm, if the access control device 102 determines that the mobile device 106 is located at the front/unsecure side of the door (e.g., due to both the RSSI data and the SNR data indicating the side of door is the unsecure side), the access control device 102 processes the data like normal, trying to determine whether the user is heading toward the door/passageway or not. If the access control device 102 determines that the mobile device 106 is located at the rear/secure side of the door, the ingress intent state machine is reset and the algorithm restarts. If the access control device 102 finds the side of door to be unknown, the access control device 102 "pauses" execution of the algorithm until further UWB data is received to be processed in an effort to resolve the discrepancy between the RSSI data and the SNR data. It should be appreciated that the method 300 of FIGS. 3-4 may be executed in conjunction with the state machine algorithm described in U.S. application Ser. No. 17/567,707, titled "UWB-Based Intent Detection for Seamless Access," and filed on Jan. 3, 2022, the entirety of which is incorporated herein by reference in its entirety. For example, in some embodiments, the "New State of Door," "Last State of Door," and/or other data may be used as an input in the ingress state machine described therein.

What is claimed is:

1. A method, comprising:
receiving, from an ultra wideband (UWB) subsystem of an access control device that secures a passageway, UWB data indicative of a distance of a mobile device relative to the access control device and a signal-to-noise ratio (SNR) of signals received by a plurality of UWB antennas of the UWB subsystem;
inferring, by the access control device, a side of the passageway at which the mobile device is located based on the distance of the mobile device relative to the access control device;
inferring, by the access control device, a side of the passageway at which the mobile device is located based on the SNR of the signals;
estimating, by the access control device, a travel time of the mobile device to the passageway based on the UWB data based on determining that the side of the passageway inferred based on the distance of the mobile device relative to the access control device is different from the side of the passageway inferred based on the SNR of the signals; and
determining, by the access control device, the side of the passageway at which the mobile device is located to be an unsecure side of the passageway based on the travel time exceeding a predefined threshold time.

2. The method of claim 1, wherein the UWB data includes received signal strength indicator (RSSI) data indicative of the distance of the mobile device relative to the access control device.

3. The method of claim 1, wherein estimating the travel time of the mobile device to the passageway comprises determining a velocity of the mobile device.

4. The method of claim 1, wherein estimating the travel time of the mobile device to the passageway comprises determining an angle of arrival of the mobile device.

5. The method of claim 1, further comprising determining, by the access control device, the side of the passageway at which the mobile device is located to be the unsecure side of the passageway in response to determining that the side of the passageway inferred based on the distance of the mobile device relative to the access control device is the unsecure side and the side of the passageway inferred based on the SNR of the signals is the unsecure side.

6. The method of claim 1, further comprising determining, by the access control device, the side of the passageway at which the mobile device is located to be a secure side of the passageway in response to determining that the side of the passageway inferred based on the distance of the mobile device relative to the access control device is the secure side and the side of the passageway inferred based on the SNR of the signals is the secure side.

7. The method of claim 1, further comprising unlocking, by the access control device, a lock mechanism associated with the access control device in response to inferring ingress intent of a user of the mobile device and determining that the mobile device is at the unsecure side of the passageway.

8. An access control device, comprising:
an ultra wideband (UWB) subsystem comprising a plurality of UWB antennas and configured to perform a ranging session with a mobile device and generate UWB data indicative of a distance of the mobile device relative to the access control device and a signal-to-noise ratio (SNR) of signals received by the plurality of UWB antennas;
a processor; and
a memory comprising a plurality of instructions stored thereon that, in response to execution by the processor, causes the processor to:
infer a side of the passageway at which the mobile device is located based on the distance of the mobile device relative to the access control device;
infer a side of the passageway at which the mobile device is located based on the SNR of the signals;
estimate a travel time of the mobile device to the passageway based on the UWB data in response to a determination that the side of the passageway inferred based on the distance of the mobile device relative to the access control device is different from the side of the passageway inferred based on the SNR of the signals; and
determine the side of the passageway at which the mobile device is located to be an unsecure side of the passageway in response to the travel time exceeding a predefined threshold time.

9. The access control device of claim 8, wherein the UWB data includes received signal strength indicator (RSSI) data indicative of the distance of the mobile device relative to the access control device.

10. The access control device of claim 8, wherein to estimate the travel time of the mobile device to the passageway comprises to determine a velocity of the mobile device.

11. The access control device of claim 8, wherein to estimate the travel time of the mobile device to the passageway comprises to determine an angle of arrival of the mobile device.

12. The access control device of claim 8, wherein the plurality of instructions further causes the processor to determine the side of the passageway at which the mobile device is located to be the unsecure side of the passageway in response to determinations that the side of the passageway inferred based on the distance of the mobile device relative to the access control device is the unsecure side and the side of the passageway inferred based on the SNR of the signals is the unsecure side.

13. The access control device of claim 8, wherein the plurality of instructions further causes the processor to determine the side of the passageway at which the mobile device is located to be a secure side of the passageway in response to determinations that the side of the passageway inferred based on the distance of the mobile device relative to the access control device is the secure side and the side of the passageway inferred based on the SNR of the signals is the secure side.

14. The access control device of claim 8, further comprising a lock mechanism configured to unlock in response to inferred ingress intent of a user of the mobile device and a determination that the mobile device is at the unsecure side of the passageway.

15. The access control device of claim 14, further comprising a credential reader.

16. An access control system, comprising:
a mobile device;
an ultra wideband (UWB) subsystem comprising a plurality of UWB antennas and configured to perform a ranging session with a mobile device and generate UWB data indicative of a distance of the mobile device relative to a passageway and a signal-to-noise ratio (SNR) of signals received by the plurality of UWB antennas;
a processor; and
a memory comprising a plurality of instructions stored thereon that, in response to execution by the processor, causes the processor to:
infer a side of the passageway at which the mobile device is located based on the distance of the mobile device relative to the UWB subsystem;
infer a side of the passageway at which the mobile device is located based on the SNR of the signals;
estimate a travel time of the mobile device to the passageway based on the UWB data in response to a determination that the side of the passageway inferred based on the distance of the mobile device relative to the UWB subsystem is different from the side of the passageway inferred based on the SNR of the signals; and
determine the side of the passageway at which the mobile device is located to be an unsecure side of the passageway in response to the travel time exceeding a predefined threshold time.

17. The access control system of claim 16, wherein the UWB data includes received signal strength indicator (RSSI) data indicative of the distance of the mobile device relative to the UWB subsystem.

18. The access control system of claim 16, wherein to estimate the travel time of the mobile device to the passageway comprises to determine a velocity of the mobile device.

19. The access control system of claim 16, wherein the plurality of instructions further causes the processor to determine the side of the passageway at which the mobile device is located to be the unsecure side of the passageway in response to determinations that the side of the passageway inferred based on the distance of the mobile device relative to the UWB subsystem is the unsecure side and the side of the passageway inferred based on the SNR of the signals is the unsecure side.

20. The access control system of claim 16, wherein the plurality of instructions further causes the processor to determine the side of the passageway at which the mobile device is located to be a secure side of the passageway in response to determinations that the side of the passageway inferred based on the distance of the mobile device relative to the UWB subsystem is the secure side and the side of the passageway inferred based on the SNR of the signals is the secure side.

* * * * *